P. ELEY.
Fertilizer.

No. 42,758. Patented May 17, 1864.

Witnesses:
Thos. J. Douglas
Geo. W. Reed

Inventor:
Phillip Eley

UNITED STATES PATENT OFFICE.

PHILLIP ELEY, OF NEW YORK, N. Y.

IMPROVEMENT IN MANURE-SPREADERS.

Specification forming part of Letters Patent No. 42,758, dated May 17, 1864.

*To all whom it may concern:*

Be it known that I, PHILLIP ELEY, of the city, county, and State of New York, have invented a new and Improved Manure-Spreading Attachment to be Applied to Wagons or Carts; and I do hereby declare that the following is a full, clear, and exact description of the same, reference being had to the accompanying drawings, making a part of this specification, in which—

Figure 1:
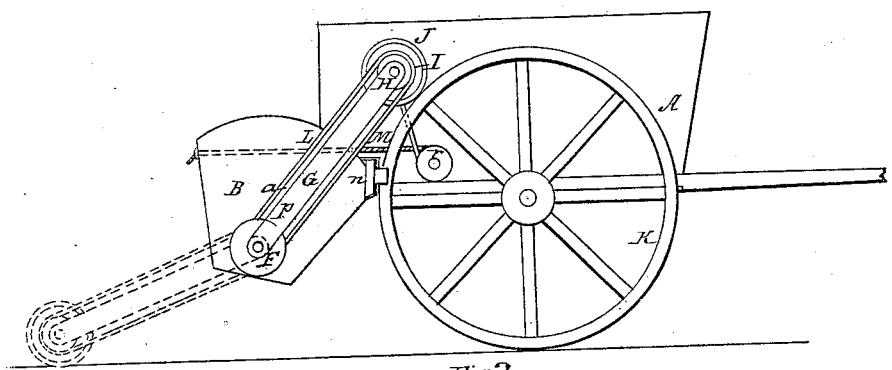
Figure 2:
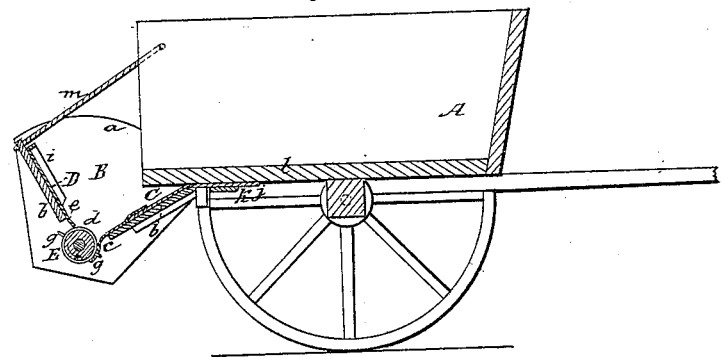
Figure 3:
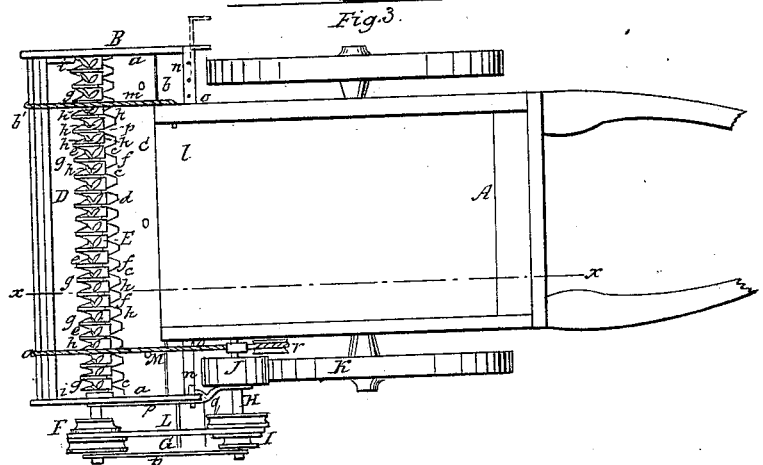

Figure 1 is a side view of my invention applied to a cart; Fig. 2, a side sectional view of the same, taken in the line $x\ x$, Fig. 3; Fig. 3, a plan or top view of the same.

Similar letters of reference indicate corresponding parts in the several figures.

The object of this invention is to obtain a simple and efficient device which may be readily applied to the back part of a cart or wagon for spreading manure therefrom, and either in hills or drills, or broadcast, as may be desired, and thereby obviate the manual labor of distributing it on the land or in the hills or drills, which consumes considerable time, and is comparatively expensive work.

To enable those skilled in the art to fully understand and construct my invention, I will proceed to describe it.

A represents a cart or two-wheeled vehicle, which may be constructed in the usual or any proper way, and therefore does not require to be specially described.

B represents a box or hopper, which has vertical ends $a\ a$ and an inclined front and back, $b\ b'$, so that a transverse section of the box or hopper will be of V form, as shown clearly in Fig. 2. This box or hopper is made a trifle longer than the width of the cart, and to the inner surface of its front side, $b$, there is attached a sheet-metal plate, C, the lower edge of which is cut, so as to form teeth $c$, which project down below the opening $d$ at the bottom of the box or hopper, as shown in Fig. 2.

To the inner surface of the back $b'$ of the box or hopper B there is attached a sheet-metal plate, D, the lower edge of which is also cut, so as to form teeth $e$, which project below the opening $d$, as shown in Fig. 2.

E is a cylinder, which is fitted in the opening $d$ at the bottom of the box or hopper B. This cylinder extends the whole length of the box or hopper, and it has a series of grooves, $f$, made circumferentially in it at equal distances apart, and in each groove there is driven one or more pins, $g$, which are in line with the spaces between the teeth $c\ c$ of the plates C D, the pins passing through said spaces as the cylinder E rotates. The spaces on the cylinder E between the grooves $f$ are grooved obliquely, as shown at $p$ in Fig. 2.

The teeth $c$ of the plate C have their ends in contact with the cylinder E below its axis, while the teeth $e$ of the plate D have their ends in contact with the upper part of the cylinder, as also shown in Fig. 2; but as the plate D is arranged so as to slide up and down within the box or hopper B, said teeth may be adjusted more or less upward so as to leave a greater or less space between the teeth $e$ and cylinder E, as may be desired. This plate D is arranged so as to slide, in consequence of having its ends fitted under guides $i\ i$, at each end of the box or hopper B.

The box or hopper B is secured to the back end of the cart A, as follows: To the front side, $b$, of the box or hopper there are attached two bars, $j\ j$, which extend outward horizontally from the upper part of $b$, and are fitted in guides $k$, attached to the under side of the cart-bed $l$. The bars $j$ are allowed to slide freely in and out of these guides, and the box or hopper is retained in proper position by one or more cords or chains, $m$, attached to the back of the cart-body, and to the back $b'$ of the box or hopper.

To the front of the box or hopper B, and directly over the front side, $b$, there is attached at each side an upright board, $n$, leaving a space between equal to the width of the widest cart or wagon to which the box or hopper may be applied, and to the outer side of each board $n$ there is attached a slide, $o$, capable of being adjusted laterally. The back of the cart or wagon is fitted within the space between the two boards $n\ n$, and if the cart or wagon be narrower than the space between said boards the slides $o\ o$ are shoved up to the sides of the cart or wagon, (see Fig. 3, in which the slides $o$ are shoved outward, in red.) In this figure the space between the boards $n\ n$ is equal to the width of the cart-body, and hence the slides $o$ are not necessary.

On one end of the shaft of the cylinder E, which extends through the side of the box or hopper B, there is fitted a cone of pulleys F, and upon this end of the cylinder-shaft is also fitted loosely a frame, G, composed of two bars, p p, one at each side of the cone of pulleys F. This frame G extends some distance above the side of the box or hopper B, and it has a shaft, H, fitted in it, on which, between the bars p p, a cone of pulleys, I, is fitted, and a wheel, J, is also fitted upon said shaft at the inner side of the frame G and in line with a wheel, K, of the cart A.

L is a belt, which passes around the pulleys F I, and on the inner bar, p, of the frame G there is attached a plate, g, which projects down at the inner side of the adjoining end of the box or hopper B, and serves, in connection with the inner bar, p, as a guide for the frame G.

To the inner end of the shaft H is attached a cord or chain, M, which passes down around a pulley, r, attached to one side of the cart and extends over the top of the box or hopper B, and is secured to the upper edge of its back b'.

From this description it will be seen that as the cart or wagon is drawn along motion will be communicated to the cylinder E through the medium of the cart-wheel K, wheel J on shaft H, the belt L, and pulleys F I, and that the wheel J may be made to bear with a greater or less pressure on the wheel K by adjusting the cord or chain M—that is to say, by drawing it more or less taut. The manure is drawn gradually into the box or hopper B from the cart A by means of a suitable drag in the hands of a person who walks behind the machine, and as the cylinder E rotates the manure is drawn by the pins g and groove h from the box or hopper between the teeth e of plate D, and the manure is thus discharged and distributed upon the ground in a broadcast manner. The teeth e of the plate C serve as cleaners or scrapers to clean the cylinder E and strip it of all manure which may adhere to it. In case long manure is being spread, the plate D and teeth e are raised upward to admit of the free escape of said manure, and in case short manure is being spread the teeth e are lowered in contact with or quite near to the cylinder E.

In cases where the manure is to be deposited in hills or drills the bottom of the box or hopper may be provided with taper spouts to cause the manure to fall into the drills or hills.

In certain cases where the wheel J would not operate well in contact with the wheel K— as, for instance, when the latter wheel is out of round or when the soil has a tendency to adhere to it—the frame G may be turned backward and free from the side of the box or hopper, so that the wheel J may rest upon the earth and be rotated by traction, as shown in red in Fig. 1.

By this invention the labor hitherto attending the spreading of manure over a field from heaps dumped at intervals is avoided, as well as the trouble of filling drills and hills by hand with a spade or manure-fork.

Having thus described my invention, what I claim as new, and desire to secure by Letters Patent, is—

1. The particular manner of attaching or applying the box or hopper B to the cart or wagon, as set forth—to wit, by having a board, n, attached to each side of the front part of the box or hopper, and a slide, a, attached to each board n, for the purpose of accommodating the box or hopper to the width of the cart or wagon, in combination with the bars j j, attached to the box or hopper, and the guides k, attached to the under side of the bed l of the cart or wagon.

2. The friction-wheel J, fitted in a frame, G, attached to the shaft of the cylinder E, in connection with the belt L and cones of pulleys F I, or their equivalents, arranged, substantially as shown, for transmitting motion to the cylinder E, either from a wheel, K, of the cart or wagon or by traction from the earth or ground, as herein described.

PHILLIP ELEY.

Witnesses:
   THOS. S. J. DOUGLAS,
   GEO. W. REED.